United States Patent [19]
Hanes et al.

[11] 3,797,366
[45] Mar. 19, 1974

[54] TELESCOPIC HYDRAULIC DECELERATOR

[75] Inventors: James W. E. Hanes, Ventura;
Edward Larralde, Santa Barbara, both of Calif.

[73] Assignee: Vetco Offshore Industries, Inc., Ventura, Calif.

[22] Filed: July 14, 1972

[21] Appl. No.: 271,770

[52] U.S. Cl............... 91/404, 92/85, 188/286, 188/297, 188/322
[51] Int. Cl................................... F15b 13/04
[58] Field of Search .......... 188/279, 284, 297, 322, 188/280, 286, 287; 91/404, 405, 407; 92/85

[56] References Cited
UNITED STATES PATENTS

| | | | |
|---|---|---|---|
| 1,095,926 | 5/1914 | Powell | 92/85 X |
| 1,150,925 | 8/1915 | Benner | 188/284 |
| 2,713,467 | 7/1955 | Schreiber | 188/297 X |
| 3,415,169 | 12/1968 | Naddell | 91/405 X |

*Primary Examiner*—George E. A. Halvosa
*Attorney, Agent, or Firm*—Bernard Kriegel

[57] ABSTRACT

A hydraulic decelerator, particularly useful in a compensator apparatus connected between a travelling block of a well bore rig, mounted on a vessel floating in a body of water, and a hook from which a running string is supported, including a plurality of telescopic sleeves associated with the piston portion of the compensator apparatus and disposed within a companion compensator cylinder, the sleeve having ports or orifices through which hydraulic fluid in the cylinder is forced as the sleeves progressively collapse one within the other during movement of the piston portion within the cylinder, to gradually decelerate over-rapid movement of the piston portion of the compensator apparatus to a desired speed.

12 Claims, 9 Drawing Figures

PATENTED MAR 19 1974  3,797,366

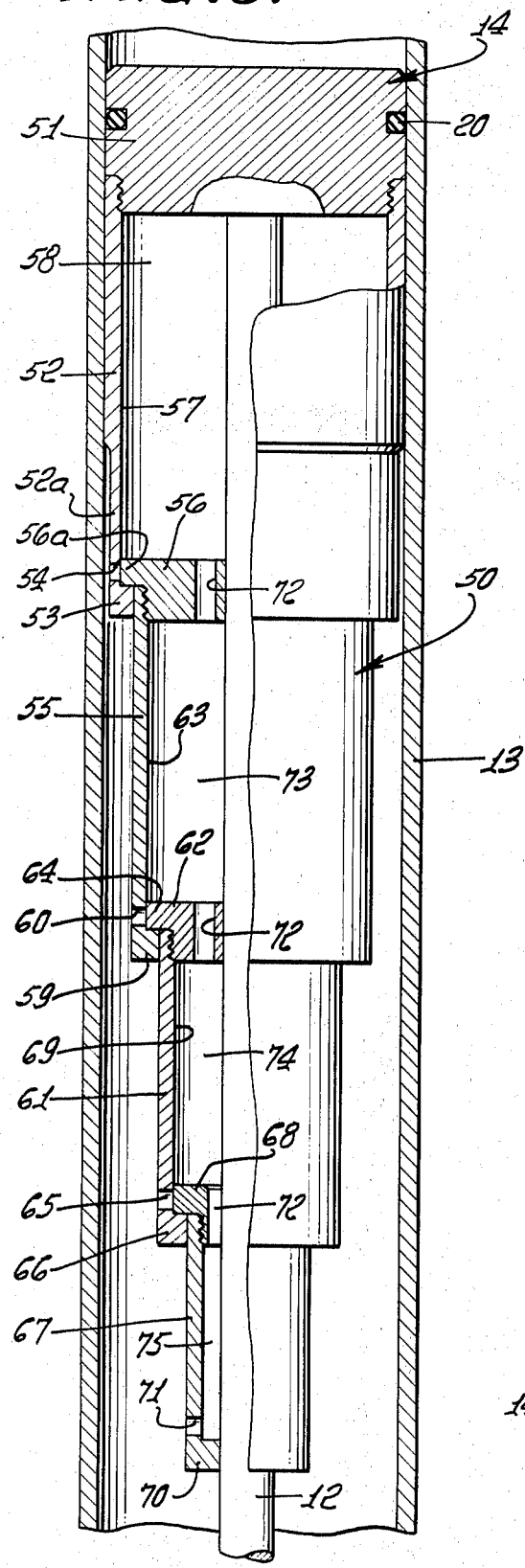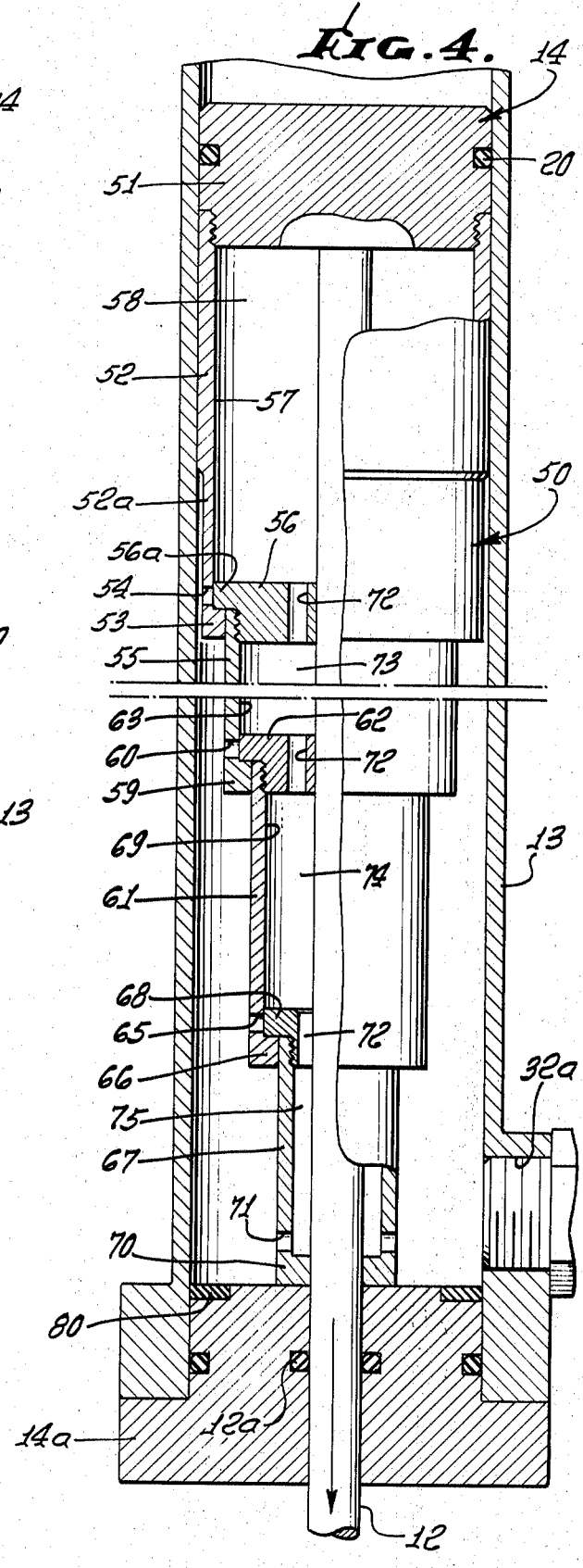

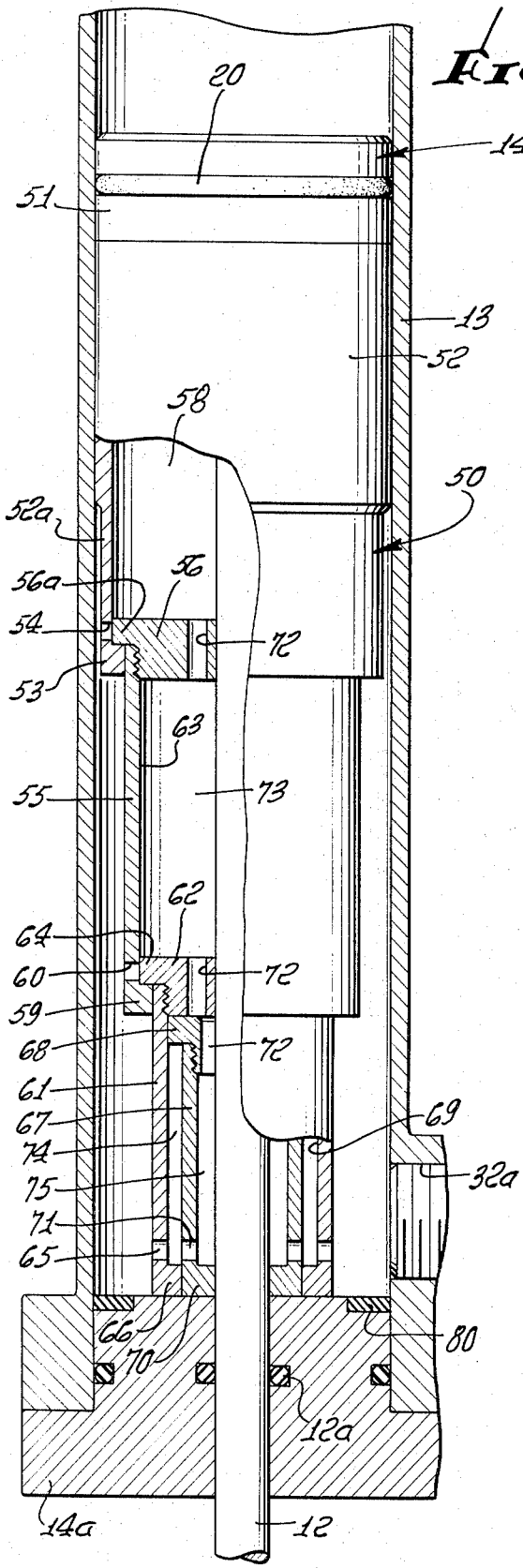
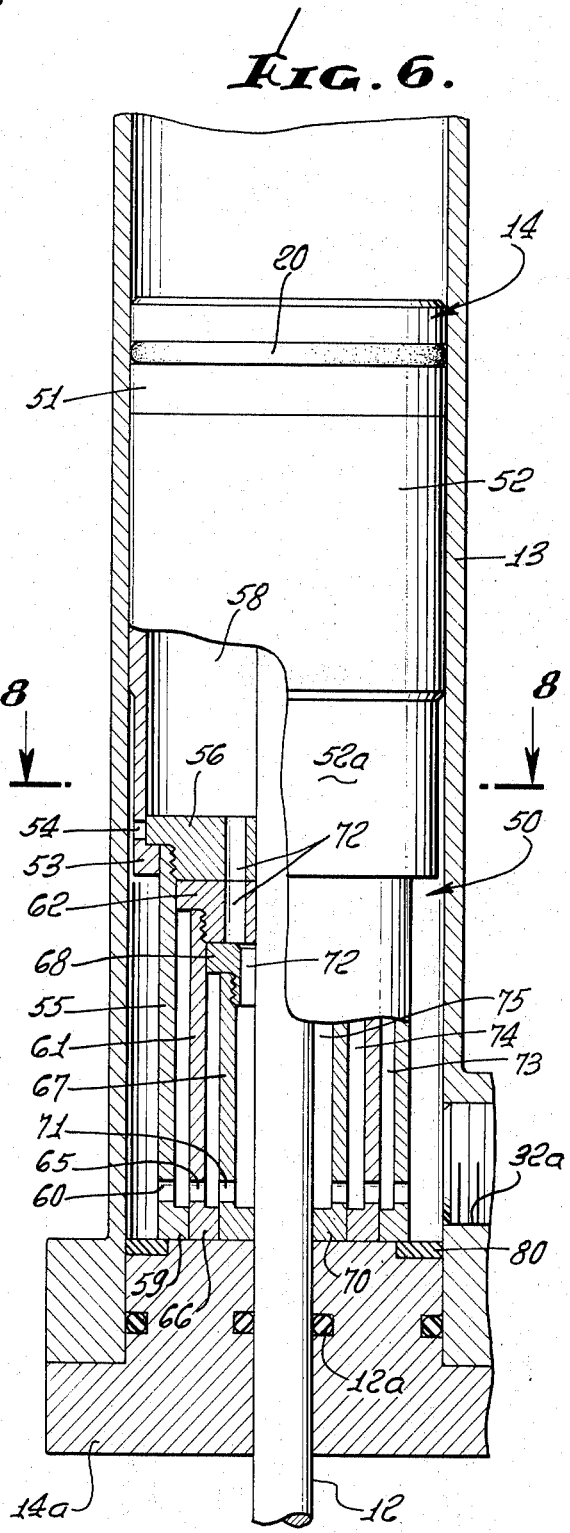

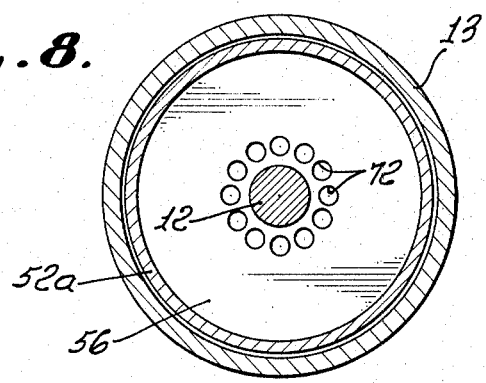
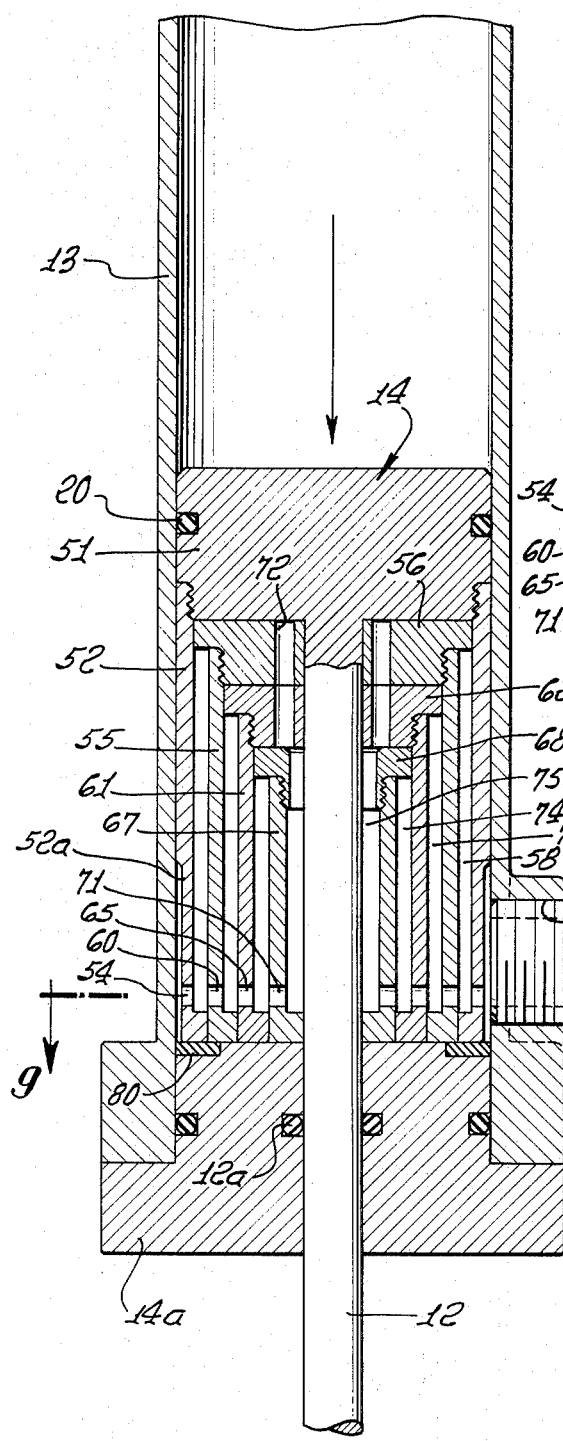
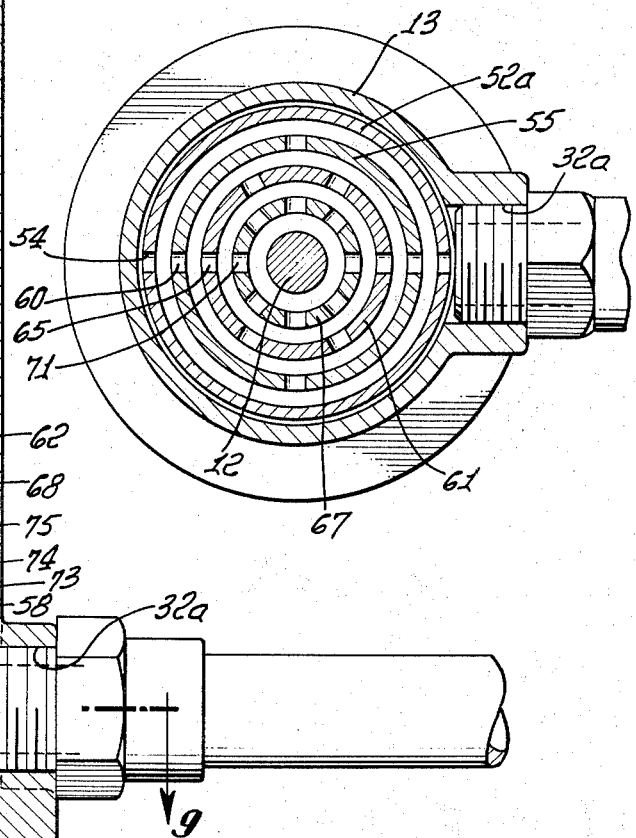

TELESCOPIC HYDRAULIC DECELERATOR

The present invention relates to deceleration or dampening devices, and more particularly to deceleration devices embodies in hydraulic motion compensators for absorbing energy in the event of fluid line failure, thereby preventing damage to the compensator and equipment associated therewith.

In the normal operation of drilling a well bore on land or from a drilling platform supported in a fixed position from the ocean floor, the weight imposed on the drilling bit is equal to the total weight of the drilling string less the weight of the drill pipe carried by the drawworks. Usually, the weight imposed on the bit is equal to the weight of the drill collar sections connected to the lower end of the drill pipe. In drilling a subaqueous well bore from a floating vessel, the heaving of the vessel under tide, wind and wave conditions introduces problems of maintaining the drilling weight on the bit at the desired value. Motion compensating devices have been proposed for overcoming the aforenoted difficulty, in which the drilling string is supported hydraulically by interposing a compensating apparatus between the travelling block and hook of the usual drilling apparatus employed in drilling the well bore. Such types of apparatus are illustrated in applicants' United States patent application, Ser. No. 69,759, filed Sept. 4, 1970, for "Motion Compensating Apparatus," now U.S. Pat. No. 3,714,995, and also in the application of Edward Larralde and Ronald E. Beaufort, Ser. No. 69,758, filed Sept. 4, 1970, for "Hydraulic-Pneumatic Weight Control and Compensating Apparatus", now U.S. Pat. No. 3,718,316.

Where the compensating apparatus is interposed between the travelling block and hook, the available height or head room in a derrick is reduced. Derricks used on drilling vessels are designed to provide for normal drilling operations; that is, to provide for the removal of and running-in of maximum lengths of drill pipe with respect to the well bore. The length added between the travelling block and hook materially reduces the available maximum travel of the drawworks or hoisting apparatus, requiring the raising and lowering of shorter stands of drill pipe in the well bore, increasing the time required in making a round trip of the pipe in the well bore.

The length of the compensator apparatus has heretofore also been increased by the addition of deceleration devices to protect the compensator apparatus and other apparatus from damage in the event of fluid line failure. A particular type of deceleration device previously employed included an enlarged portion of a piston rod adjacent to the piston which moves into a restricted cylinder bore, at the lower end of which is a hydraulic fluid connection through which the fluid under pressure enters and leaves the compensator cylinder. As the piston approaches the downward limit of its stroke within the compensator cylinder, the enlarged portion of the piston rod enters the restricted bore and thereby restricts the flow of fluid. To effectively dampen the motion of the piston and piston rod, in the event of hydraulic fluid pressure failure, a considerable additional length must be incorporated in the cylinder and the piston rod, this added length becoming prohibitive in many applications, such as, for example, in the use of compensator apparatus located between a travelling block and hook of a well bore rig mounted on a floating drilling vessel.

By virtue of the present invention, a hydraulic decelerator is provided that incorporates a hydraulic dampener or deceleration device which effectively decelerates the excessive rate of relative movement of the piston within the cylinder in the event of fluid line failure or other fluid pressure failure, the additional length added by the deceleration device to the compensator being considerably reduced with respect to prior devices. More specifically, the deceleration device is disposed within the motion compensator cylinder and acts between the compensator piston and an end portion of the compensator cylinder.

Another objective of the invention is to provide a hydraulic decelerator which is velocity sensitive, in that the movement of the piston portion of the apparatus relative to the cylinder is caused to decrease relatively gradually as the piston moves to the end of its travel within the cylinder. More specifically, the flow of hydraulic fluid in the cylinder is progressively retarded by causing it to flow through orifices of smaller effective areas, thereby progressively increasing the fluid pressure drop of the fluid flow through the orifices, and effecting a progressive or comparatively gradual decrease in the rate of speed of the loaded piston and its associated piston rod within the cylinder.

A further object of the invention is to provide a telescopic deceleration dampener, which will gradually decelerate the loaded piston and piston rod to the desired speed, providing a cushioning effect that prevents the rod and piston assembly from striking the rod end of the cylinder with destructive force in the event of fluid line or other failure in the system.

Yet another object of the invention is to provide a deceleration dampener embodying telescopic sleeves having orifices therein through which the hydraulic fluid will be forced, the collapsing or telescopic contracting action of the several sleeves with respect to each other providing for the required deceleration in the piston portion of the apparatus within the cylinder, a relatively short space being required by the telescopic sleeves or corresponding members. The length added to the cylinder by the deceleration device is merely that required to nest the several sleeves one within the other when they are fully collapsed upon bringing the piston portion of the apparatus to rest within its companion cylinder.

A further object of the invention is to provide a deceleration apparatus of the hydraulic type, in which the deceleration apparatus has no appreciable effect on the operation of the piston within its companion cylinder during relatively slow motion of the piston within the cylinder under normal operating conditions. The use of the deceleration apparatus, in which liquid is forced through one or more ports, does not build up appreciable resistance to movement of the piston within the cylinder when fluid is transferred through the ports at a relatively low velocity. Substantial pressure differentials are built up within the deceleration device in the event of its tending to force the liquid through the orifices at a relatively high velocity.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIGS. 3, 4, 5, 6 and 7 are enlarged views, partly in longitudinal section and partly in side elevation, through the decelerator portion of the apparatus disclosed in FIG. 2, the parts being shown in different operative positions;

FIG. 8 is a cross-section taken along the line 8—8 on FIG. 6;

FIG. 9 is a cross-section taken along the line 9—9 on FIG. 7.

Figure 1:
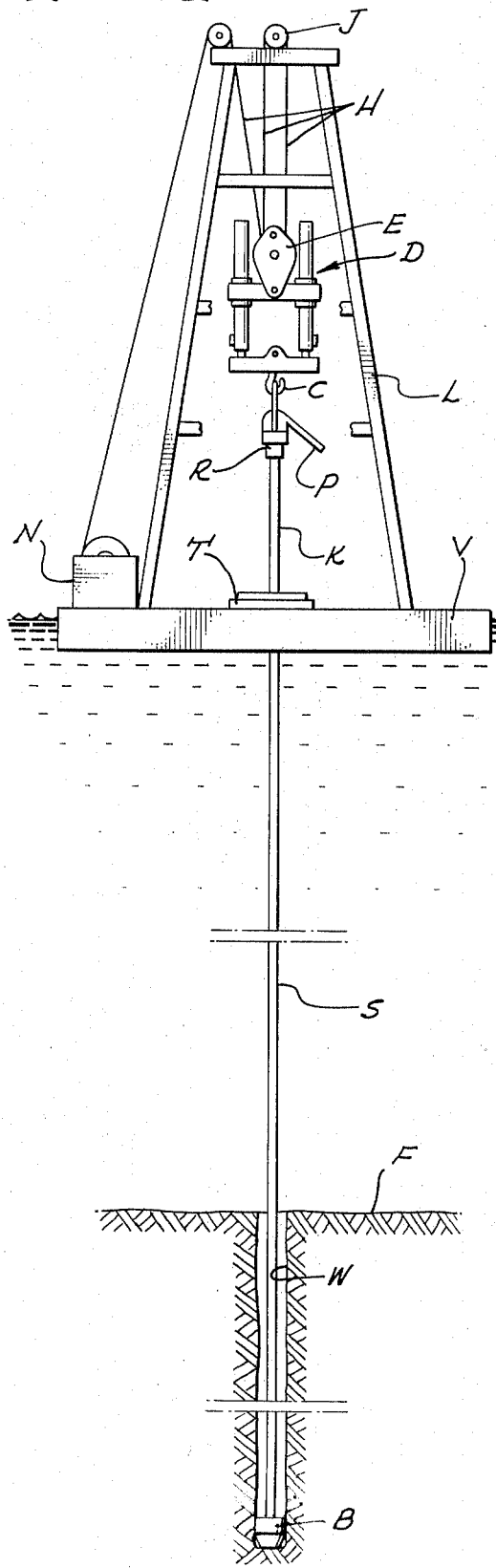
FIG. 1 is a diagrammatic view of a drilling rig mounted on a floating vessel for drilling a subaqueous bore hole.

The apparatus is disclosed in connection with the drilling of a vertical well bore W from a subaqueous floor F above which a floating vessel V, such as a drilling barge, is located, the barge being suitably anchored against lateral displacement for the purpose of retaining the tubular drilling string S in centered relation with respect to the well bore. A drill bit B is secured to the lower end of the drill string, such as a string of drill pipe or a drill casing, the upper kelly portion K of the drill string passing through the usual rotary table T rotated by a suitable drive mechanism (not shown). The upper end of the kelly is secured to a swivel R suspended from a hook C pivotally connected to the lower end of a compensating apparatus D, the upper end of which is pivotally connected to the travelling block E associated with the usual lines H passing over the crown block J at the upper end of the derrick L secured in place on the floating drilling vessel, the cables or lines being connected to a suitable drawworks N mounted on the floating barge.

A mudline P is connected to the swivel for the purpose of delivering drilling mud to the drill string for discharge from the drill bit B, to remove the cuttings produced by the latter, while appropriate drilling weight is imposed thereon, with the drilling string being rotated by the table T at the desired speed. Usually, the drilling weight is provided by a suitable length of drill collars disposed in the lower portion of the drill string S immediately above the drill bit B, the drill string above the drill collars being maintained in tension by the drawworks N and lines H, the drawworks permitting the drill string to lower as the hole W is being produced.

The compensating apparatus D permits the floating vessel V, and the mechanism carried thereby, to shift vertically relative to the well bore W and drilling string S, without appreciably modifying the drilling weight imposed on the drill bit B. This compensating apparatus includes a lower supporting structure 10 connected to the hooks C, and an upper supporting structure 11 connected to the lower end of the travelling block E. In the specific form of compensating apparatus illustrated, the lower supporting structure 10 is secured to the lower end of a pair of piston rods 12 extending upwardly into a pair of cylinders 13 affixed to the upper supporting structure 11. The upper ends of the piston rods are secured to pistons 14 having appropriate seal rings 20 thereon for slidably sealing against the cylinder walls, the rod ends 14a of the cylinders 13 carrying appropriate packings 12a for slidably sealing against the periphery of the piston rods 12. The cylinders 13 are disposed on opposite sides of the travelling block E and extend thereabove to reduce the overall length of the compensating unit D, while permitting the pistons 14 and rods 12 to shift longitudinally within the cylinders 13 to a substantial extent, the pistons, when disposed at the upper head ends 22 of the cylinders, still permitting the drawworks to elevate the travelling block E and compensating unit D to an extent at which the usual length of drill pipe can be connected to, or removed from, the drilling string S. The arrangement of the compensating apparatus D with respect to the traveling block E and hook C forms the subject matter of the above-identified application of Edward Larralde and James W. E. Hanes, Ser. No. 69,759.

It is evident that the travelling block E is secured to the cylinders 13, so that the latter move vertically therewith, while the pistons 14 and piston rods 12 are secured to the hook C, and through the swivel R to the upper end of the drill string S. The weight of the drill string is transmitted through the hook C to the piston rods 12 and pistons 14, and then to liquid 15 filling the cylinder spaces below the pistons 14, from where it is transmitted to the lower cylinder heads 14a and to the cylinders 13 themselves, the load then being transferred through the travelling block E and the lines H to the crown block J. As noted above, elevation and descent of the travelling block E and, therefore, of the compensating unit D, and the entire load S suspended therefrom, is determined by the operation of the drawworks N.

As disclosed in the above-identified application of Edward Larralde and Ronald E. Beaufort, Ser. No. 69,758 a substantially constant predetermined pressure is maintained on the liquid medium 15 disposed in the cylinders 13. In general, this latter system maintains the pressure of the liquid in the cylinders of the compensating apparatus at a selected constant value through use of an accumulator 30, in which the pressure of a gas 31 in the accumulator is transferred through a piston 33 to the liquid medium 15 therein, and through the fluid lines 32 connected to the lower ends of the cylinders 13, to the portion of such liquid medium disposed in the cylinders 13 of the compensating apparatus. The gas, such as compressed air, is maintained at the desired pressure through the line 34 and associated equipment (not shown).

In the event of a failure of one of the fluid lines 32, or other loss of fluid pressure in the compensator apparatus D, the pistons 14 and rods 12 associated therewith would tend to drop at a rapid rate within the cylinders 13, particularly in view of relatively heavy loads that might be carried by such rods. A deceleration device 50 is included in each cylinder 13, for the purpose of gradually decelerating each piston 14 and its rod 12 in the event of fluid line failure or other cause of loss of pressure in the compensator cylinder. As disclosed somewhat diagrammatically in FIGS. 3 to 9, inclusive, each piston 14 comprises a head 51 carrying the suitable side seal ring 20 adapted to slidably seal along the wall of its associated cylinder 13, from which depends an elongate piston skirt 52 threadedly secured to the head and also slidable along the cylinder. The lower portion 52a of the skirt is of reduced diameter, its lower end terminating in an inwardly directed flange 53, a plurality of side ports or orifices 54 being provided through the piston skirt immediately above the flange 53.

Suspended from the upper piston sleeve or skirt 52 is an intermediate sleeve 55 of lesser diameter than the upper piston sleeve 52, the intermediate sleeve being suitably secured to an upper head 56 extending from the inner wall 57 of the upper piston sleeve to the piston rod 12. The outer portion 56a of this intermediate head is adapted to rest upon the lower flange 53 and to make a close fit or slidable seal against the inner wall 57 of the first piston sleeve, the intermediate head closing the ports 54 against substantial passage of liquid between the interior 58 of the upper piston sleeve, through the ports 54 to the exterior of the upper piston sleeve 52.

The intermediate sleeve 55 also has a lower inwardly directed flange 59 disposed immediately below a plurality of ports or orifices 60 through the sleeve wall, this flange serving to suspend a still lower or third piston sleeve 61 therefrom. Thus, the third piston sleeve is suitably secured to a third head 62 extending from the inner cylindrical wall 63 of the second sleeve 55 to the piston rod 12, the periphery of the head also extending across the ports 60 of the second sleeve and making a close fit or slidable seal against the inner cylindrical wall 63 of the second sleeve, with the outer portion 64 of the third head hung from the inwardly directed flange 59. It is to be noted that the external diameter of the third sleeve 61 is less than the external diameter of the second sleeve 55, this third sleeve having a plurality of ports or orifices 65 in its lower portion immediately above an inwardly directed flange 66, from which a fourth sleeve 67 of lesser diameter than the third sleeve 61 is hung. The lowermost or fourth sleeve illustrated also has an upper head 68 extending from the inner wall 69 of the third sleeve to the piston rod 12, this head resting upon the flange 66 and closing the ports or orifices 65 through the third sleeve, the head also making a close fit or slidable seal against the inner wall 69 of the third sleeve. The fourth sleeve 67 also has an inwardly directed flange 70 at its lower end extending to the rod 12 and above which are disposed a plurality of ports or orifices 71.

Fluid communication between the interiors 58, 73, 74, 75 of the piston skirt or sleeve 52 and the other sleeves 55, 61, 67 can occur because of the multiplicity of large area slots or ports 72 extending through the sleeve heads 56, 62, 68. Fluid can travel between the spaces 58, 73, 74, 75 through these ports 72 upon collapsing of the telescopic sleeves 52, 55, 61, 67 one within the other, which occurs when the decelerating action is required. Normally, however, the piston 14 and the telescopic sleeves are in their fully extended position (FIG. 3) and move as a unit relatively within the cylinder 13. The trapped fluid can only escape from the interior of the several sleeves 52, 55, 61, 67 through the ports 71, 65, 60, 54, the area of each series of ports or orifices progressively decreasing from the lowermost sleeve 67 to the piston skirt or sleeve 52, so as to allow the fluid trapped within the nested or telescopic sleeves to escape therefrom at a diminishing rate. By way of example, if the area of the flow port 32a leading into a cylinder 13 is deemed to have a value of 100 percent, then the combined areas through the ports 71 in the sleeve 67 may be about 60 percent of such area, the ports 65 in sleeve 61 45 percent of the total area of the cylinder port 32a, the ports 60 in sleeve 55 30 percent of the area of the cylinder inlet and outlet port 32a, and the ports 54 in the sleeve or skirt 52 15 percent of the area of the inlet and outlet port 32a leading to and from the cylinder 13. As the ports are successively opened to the fluid trapped within the piston skirt 52 and piston sleeves 55, 61, 67, the restriction to flow increases, thereby further decelerating the rate of relative descent of the piston 14 and the piston rod 12 within the cylinder 13.

Figure 2:
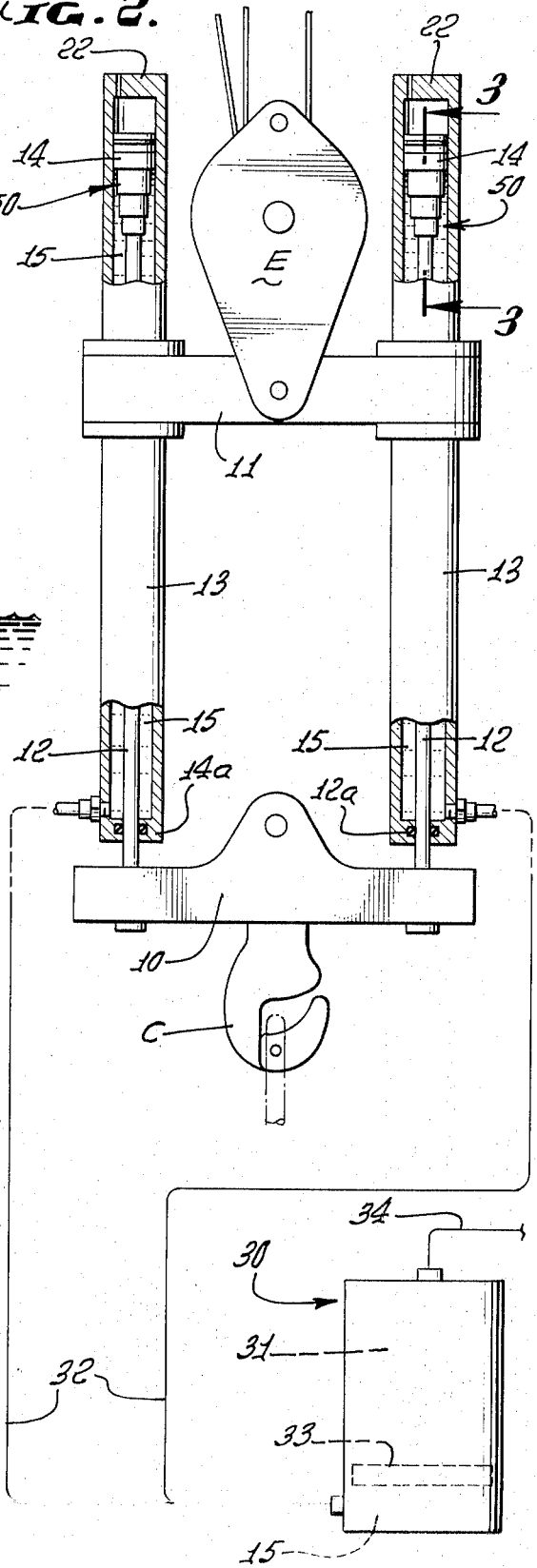
FIG. 2 is a front elevational view, with parts in longitudinal section, of the compensator portion of the apparatus disclosed in FIG. 1.

As noted above, the telescopic sleeves 52, 55, 61, 67 are extended by gravity when the lower end of the lowermost sleeve 67 is out of contact with the rod end 14a of the cylinder 13 (FIGS. 2, 3). In this position, the heads 56, 62, 61, 67 of the sleeves effectively cover the ports in the adjacent sleeve from which they are suspended, the lowermost set of ports 71 being open at all times. To insure against fluid leakage around the periphery of the several heads, a suitable side seal (not shown) may be disposed in the periphery of each head for slidably sealing against the companion inner cylindrical wall 57, 63, 69 of its encompassing sleeve.

In the event of a substantial reduction in the fluid pressure within the cylinder 13, the piston rod 12, piston head 51 and the sleeves 52, 55, 61, 67 depending therefrom move relatively downwardly as a unit within the cylinder 12, until the lower end of the lowermost sleeve 67 engages the rod end 14a of the cylinder, arresting such lowermost sleeve (FIG. 4). The sleeves 61, 55, 52 above such lowermost sleeve and the piston 14 and rod 12 continue to move downwardly as a unit, the trapped fluid in the space 74 within the sleeve 61 and the liquid in the lowermost sleeve being forced through the restricted ports or orifices 71, all of the ports 64, 60, 54 in the sleeves above the lowermost sleeve remaining in a closed condition. The speed of the piston rod, piston and the sleeves depending therefrom is retarded because of the necessity for the liquid to be forced through the restricted ports 71, building up a pressure differential within the confined sleeve spaces 58, 73, 74, 75.

As descent of the piston rod 12, piston 14 and the sleeves 52, 55, 61 continues, the second sleeve 61 will move into contact with the cylinder head end 14a, its flange 66 moving below the ports 71 in the lowermost sleeve, thereby placing the sets of ports 71, 65 in communication with one another (FIG. 5). In this case, the effective orifice area through which the trapped fluid in the interior 73 of the piston sleeve 55 must move is the lesser combined area through the ports or orifices 65 of the second sleeve 61, thereby creating a greater pressure differential across such ports and further retarding the speed of descent of the piston rod 12, piston head 51 and sleeves 52, 55.

Continued descent of the piston head 51, its skirt 52 and the sleeve 55 depending from the skirt will bring the lower end of the piston sleeve 55 into contact with the cylinder head 12a, thereby placing the three sets of ports 60, 65, 71 in communication with one another (FIG. 6), the ports or orifices 60 of smaller area then being effective to produce yet a greater pressure differential in the fluid in the trapped space 58 within the piston skirt 52, causing yet a further retarding in the speed of descent of the piston rod 12 and piston 14 within the cylinder 13, in view of the greater pressure differential required to force the trapped fluid within the piston skirt outwardly through the aligned orifices. The piston 14 finally comes to rest upon its skirt 52 contacting the cylinder head 14a at the rod end of the cylinder 13 (FIG. 7). If desired, the final landing of the piston skirt upon the cylinder head may be further cushioned by the provision of an elastomer ring 80 on the cylinder head engaged by the end 53 of the piston skirt.

Although four telescopic piston sleeves 52, 55, 61, 67, with progressively decreasing orifice areas through which trapped fluid must flow, have been illustrated by way of example, it is apparent that the number of sleeves can be varied, depending upon the length of dampening effect required. The effective orifice areas through the sleeves will be correspondingly varied in accordance with the number of sleeves provided.

During the normal operation of the compensator D, the piston 14 and sleeves move within a suitable operating range without contacting either the head end 22 or the rod end 14a of the cylinder 13. Even if the piston, piston rod and sleeve assembly move into a position of contact of the lowermost sleeve 67 with the lower cylinder head 14a, the relatively slow motion of the piston and its sleeves with respect to the cylinder 13 results in a low velocity of fluid transfer through the lowermost ports 71, or, for that matter, through the other ports 65, 60, 54, such low velocity of fluid transfer developing a low pressure differential in the fluid upstream of the ports and having a minimal dampening effect on the movement of the piston and sleeve structures within the cylinder, nor does it have any effect on the operation of the compensator D in supporting the load S suspended from each piston rod 12.

By virtue of the present invention, a velocity sensitive hydraulic dampener has been provided, in which the pressure drop through the several orifices increases as the rod, piston and sleeves move to their lowermost positions within the cylinder 13, providing for an increase in the deceleration rate of the rod 12 and piston 14 within the cylinder 13. Each dampener or deceleration apparatus 50 is incorporated within the compensator cylinder 13 itself, and does not require the addition of any material length to the cylinder 13, in view of the ability of the sleeves to telescope one within the other. Thus, the overall length added to the compensator apparatus D is well below the added length required in prior deceleration or dampening devices.

We claim:

1. In deceleration apparatus: a cylinder having a main passage through which fluid under pressure can flow into and from said cylinder; a piston slidable relatively in said cylinder and adapted to be acted upon by the fluid under pressure in said cylinder; a piston rod fixed to said piston and extending through a piston rod end of said cylinder in slidable sealed relation thereto; and deceleration means in said cylinder surrounding said piston rod and carried by said piston and movable with said piston and rod relative to said cylinder, said deceleration means comprising sleeve means movable with respect to said piston and rod and engageable with said piston rod end of said cylinder upon movement of said piston toward said piston rod end of said cylinder, said sleeve means having a restricted flow passage through which said piston forces fluid in said cylinder after said sleeve means engages said piston rod end of said cylinder and said piston continues its movement toward said piston rod end of said cylinder.

2. In apparatus as defined in claim 1; said restricted flow passage communicating with said main passage and having an effective fluid passage area substantially less than the effective area of said main passage.

3. In apparatus as defined in claim 1; said piston having a head and a skirt; said sleeve means including a sleeve normally supported by and telescoped within said skirt for movement toward said head, said sleeve having said restricted flow passage, whereby engagement of said sleeve with said piston rod end of said cylinder end relatively shifts said sleeve within said skirt toward said piston head and forces fluid within said skirt and sleeve through said restricted flow passage.

4. In apparatus as defined in claim 1; said piston having a head and a skirt; said sleeve means including a sleeve normally supported by and telescoped within said skirt for movement toward said head, said sleeve having said restricted flow passage, whereby engagement of said sleeve with said piston rod end of said cylinder end relatively shifts said sleeve within said skirt toward said piston head and forces fluid within said skirt and sleeve through said restricted flow passage; said restricted flow passage communicating with said main passage and having an effective fluid pressure area substantially less than the effective area of said main passage.

5. In apparatus as defined in claim 1, said piston having a head and a skirt; said sleeve means including a first sleeve normally supported by and telescoped within said skirt and a second sleeve normally supported by and telescoped within said first sleeve, said first and second sleeves being movable longitudinally of said piston rod and skirt toward said head, said first and second sleeves each having a restricted flow passage, whereby progressive stopping of said second sleeve and first sleeve by said piston rod end of said cylinder shifts said second sleeve relatively within said first sleeve and then said second sleeve and first sleeve within said skirt and forces fluid within said skirt and sleeves through said restricted flow passages.

6. In apparatus as defined in claim 1; said piston means having a head and a skirt; said sleeve means including a first sleeve normally supported by and telescoped within said skirt and a second sleeve normally supported by and telescoped within said first sleeve, said first and second sleeves being movable longitudinally of said piston rod and skirt toward said head, said first and second sleeves each having a restricted flow passage, whereby progressive stopping of said second sleeve and first sleeve by said piston rod end of said cylinder shifts said second sleeve relatively within said first sleeve and then said second sleeve and first sleeve within said skirt and forces fluid within said skirt and sleeves through said restricted flow passages; said restricted flow passages being communicable with said main passage and with each other, said second sleeve passage having an effective fluid pressure area substantially less than the effective area of said main passage, said first sleeve passage having an effective fluid pressure area substantially less than the effective fluid pressure area of said second sleeve.

7. In apparatus for maintaining a predetermined stress in a running string: a cylinder having a main passage through which fluid under pressure can flow into and from said cylinder; a piston slidable relatively in said cylinder and adapted to be acted upon by the fluid under pressure in said cylinder; a piston rod fixed to said piston and extending through the piston rod end of said cylinder in slidable sealed relation thereto; one of said cylinder and piston rod having a device connected thereto adapted for operative connection to the running string; the other of said cylinder and piston rod having a device connected thereto adapted for operative connection to a support; means for maintaining said fluid under substantially constant predetermined pressure on one side of said piston as said cylinder and said piston and rod move longitudinally relative to one another in both longitudinal directions; and deceleration means in said cylinder surrounding said piston rod and carried by said piston and movable with said piston and rod relative to said cylinder, said deceleration means comprising sleeve means movable with respect to said piston and rod and engageable with said piston rod end of said cylinder upon movement of said piston toward said piston rod end of said cylinder, said sleeve means having a restricted flow passage through which said piston forces said fluid in said cylinder after said sleeve means engages said piston rod end of said cylinder and said piston continues its movement toward said piston rod end of said cylinder.

8. In apparatus as defined in claim 7; said restricted flow passage communicating with said main passage and having an effective fluid passage area substantially less than the effective area of said main passage.

9. In apparatus as defined in claim 7; said piston having a head and a skirt; said sleeve means including a sleeve normally supported by and telescoped within said skirt for movement toward said head, said sleeve having said restricted flow passage, whereby engagement of said sleeve with said piston rod end of said cylinder relatively shifts said sleeve within said skirt toward said piston head and forces the fluid medium within said skirt and sleeve through said restricted flow passage.

10. In apparatus as defined in claim 7; said piston having a head and a skirt; said sleeves means including a sleeve normally supported by and telescoped within said skirt for movement toward said head, said sleeve having said restricted flow passage, whereby engagement of said sleeve with said piston rod end of said cylinder relatively shifts said sleeve within said skirt toward said piston head and forces the fluid medium within said skirt and sleeve through said restricted flow passage; said flow passage communicating with said main passage and having an effective fluid passage area substantially less than the effective area of said main passage.

11. In apparatus as defined in claim 7; said piston having a head and a skirt; said sleeve means including a first sleeve normally supported by and telescoped within said skirt and a second sleeve normally supported by and telescoped within said first sleeve, said first and second sleeves being movable longitudinally of said piston rod and skirt toward said head, said first and second sleeves each having said restricted flow passage, whereby progressive stopping of said second sleeve and first sleeve by said piston rod end of said cylinder shifts said second sleeve within said first sleeve and then said first and second sleeves within said skirt and forces the fluid medium within said skirt and sleeves through said restricted flow passages.

12. In apparatus as defined in claim 7; said piston having a head and a skirt; said sleeve means including a first sleeve normally supported by and telescoped within said skirt and a second sleeve normally supported by and telescoped within said first sleeve, said first and second sleeves being movable longitudinally of said piston rod and skirt toward said head, said first and second sleeves each having said restricted flow passage, whereby progressive stopping of said second sleeve and first sleeve by said cylinder shifts said second sleeve within said first sleeve and then said first and second sleeves within said skirt and forces the fluid medium within said skirt and sleeves through said restricted flow passages; said restricted flow passages being communicable with said main passage and with each other, said second sleeve passage having an effective fluid passage area substantially less than the effective area of said main passage, said first sleeve passage having an effective fluid pressure area substantially less than the effective fluid pressure area of said second sleeve.

* * * * *

UNITED STATES PATENT OFFICE
CERTIFICATE OF CORRECTION

Patent No. 3,797,366          Dated March 19, 1974

Inventor(s)   JAMES W. E. HANES ET AL

It is certified that error appears in the above-identified patent and that said Letters Patent are hereby corrected as shown below:

Column 6, line 34: "64" should read --65--.

Column 8, line 9: cancel "end".

line 40: cancel "means". (first occurrence)

line 66: "the" should be --a--.

Column 10, line 30: after "said" (first occurrence) insert --piston rod end of said--.

Signed and sealed this 22nd day of October 1974.

(SEAL)
Attest:

McCOY M. GIBSON JR.
Attesting Officer

C. MARSHALL DANN
Commissioner of Patents